Jan. 9, 1968   J. M. HARRIS ET AL   3,363,133
ELECTRIC DISCHARGE DEVICE HAVING POLYCRYSTALLINE
ALUMINA END CAPS
Filed Feb. 28, 1966
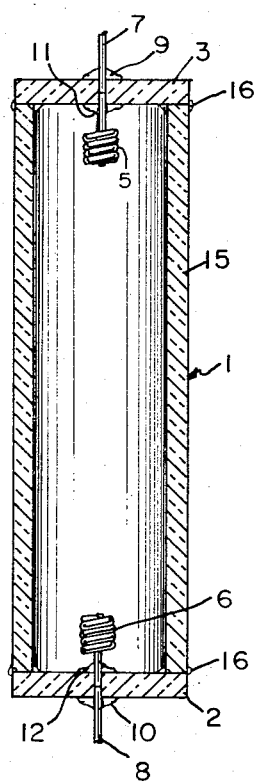
JOSEPH M. HARRIS
FREDERICK A. LOUGHRIDGE
   INVENTORS
BY
   ATTORNEY 3,363,133
ELECTRIC DISCHARGE DEVICE HAVING POLYCRYSTALLINE ALUMINA END CAPS
Joseph M. Harris, Topsfield, and Frederick A. Loughridge, Manchester, Mass., assignors to Sylvania Electric Products Inc., a corporation of Delaware
Filed Feb. 28, 1966, Ser. No. 530,297
5 Claims. (Cl. 313—217)

ABSTRACT OF THE DISCLOSURE

A discharge device including an arc tube formed of polycrystalline alumina with end caps of the same material. The arc tube includes interiorly disposed tungsten electrodes and exteriorly disposed lead-in connectors of a dissimilar metal which are connected to the electrodes. Preferably the juncture of the electrodes and the lead-in wires is disposed within the end cap, thereby protecting the junction from the arc tube atmosphere.

---

This invention relates to electric discharge devices and particularly to those which contain a fill of mercury, a halogen, an alkaline metal and a light-emitting metal in an arc tube formed of polycrystalline alumina.

Polycrystalline alumina envelopes for electric discharge devices are known to the art, however, heretofore it has not been possible to add a fill including a halogen to them. In the manufacture of these devices, the art resorted to the use of metal end caps to hold the electrodes and retain the filling. These metal end caps have been used primarily because polycrystalline alumina will not form press seals in the same manner as the quartz material conventionally used for arc tubes. Quartz will soften at temperatures of about 1400° C. and electrodes can be sealed therein. The softening point of the polycrystalline alumina, however, is about 1600 to 2000° C. and when heated to these temperatures, the alumina breaks down and the polycrystallinity tends to disappear. Hence, the art has not been able to seal these arc tubes according to conventional techniques and metal end caps became a necessity.

But with metal end caps, when a halogen was included in the filling it tended to react adversely and the device was shortly rendered inoperative. According to our invention, we have discovered that polycrystalline alumina discs containing appropriate apertures for electrodes can be sealed to the ends of the polycrystalline alumina envelopes and the adverse reaction with the end caps are prevented. In order to form this type of device, we have discovered that certain modifications must be made in the electrode structure.

When polycrystalline alumina envelopes are used, the operating temperature of the electric discharge can be raised significantly. Since the lowest temperature in the arc tube governs the partial pressures of the various ingredients contained therein, raising of this temperature enables greater quantities of ingredients to enter the discharge. If, for example, greater quantities of light-emitting metals, such as scandium or thorium, enter the discharge, the brightness of the lamp will be increased. Moreover, the entrance of these metals increases the red emission and the lamp will have better red rendition than those operating at lower temperatures.

Through the use of polycrystalline alumina arc tube cylinders having discs of polycrystalline alumina disposed at either end thereof, many crevices and cold spots formally associated with quartz arc tubes are eliminated. Inherently, when quartz was press sealed, crevices occurred at the points where the quartz collapsed and sealed to the other side of the envelope. The polycrystalline alumina envelopes do not have such crevices and hence such cold spots are substantially eliminated. As discussed above, with the elimination of such cold spots greater quantities of such metals can enter the arc stream.

An object of our invention is to increase the efficiency and red rendition of electric discharge devices containing fills of mercury, a halogen and a light emitting metal.

Another object of our invention is the attainment of higher operating temperatures in electric discharge devices containing such fills.

The many other objects, features and advantages of our invention will become manifest to those conversant with the art upon reading the folowing specification when taken in conjunction with the accompanying drawing wherein preferred embodiments of our invention are shown and described by way of illustrative examples.

Of the drawing, the figure is a cross-sectional view of an electric discharge device adapted to contain a fill of mercury, a halogen and a light-emitting metal together with an alkali metal if desired and contained in a polycrystalline alumina envelope having polycrystalline alumina end caps.

Referring now to the drawing, the lamp comprises an envelope 1 of ceramic tubing 15 of sintered, translucent, polycrystalline alumina. The tubing material has a high alumina content generally of 99.5% $Al_2O_3$ and when not operating, tends to be translucent rather than clear like quartz, which is generally used with such fills. The light transmittance, however, is exceedingly high and quite adaptable to lamp purposes. Disposed at either end of this polycrystalline alumina tubing 15 are end caps 2 and 3 which are sealed to the tubing 15 with a glass frit 16. An aperture is formed in each end cap for the positioning of electrodes 5 and 6 and lead-in wires 7 and 8. The electrodes are formed of a high melting refractory metal which in inert to reactions with the halide present in the arc tube. Generally tungsten is used. The lead-in wires 7 and 8 are formed of a metal which has a co-efficient of expansion compatible with polycrystalline alumina arc tube end caps 3 and 2. For this purpose, we have found that niobium wire fulfills this criteria. We have discovered that the lead-in wires 7 and 8 should be welded to the tungsten electrodes 5 and 6 so that an adequate electrical connection is made. The weld should be disposed within the width of the end caps 2 and 3 but may be positioned outside of the arc tube if necessary. However, the niobium wire cannot extend into the arc tube because of the possibility of adverse reaction with the therein contained halogen.

The lead-in wires 7 and 8 are sealed to the end caps 2 and 3 by means of frit seals 9 and 10. Frit seals 11 and 12 are disposed inside of the arc tube 1 and hold electrodes 5 and 6 in place.

The device of our invention has no exhaust tube for the addition of filling materials or pumping operations. Advantageously, through the elimination of the exhaust tube no cold spot is present in the arc tube which would reduce the partial pressure of the vapor contained therein when the lamp is operating.

The fill in the arc tube comprises a halogen, preferably iodine atoms, and except fluorine, together with mercury atoms and atoms of a light emitting metal. The light emitting metal may include therein, scandium, thallium, vanadium, molybdenum, indium, gallium, or rare earth metals. Additionally, it is frequently advantageous to add a quantity of alkali metal atoms to control the operating characteristics of the arc. The fills may be in quantities known to the art such as disclosed in the copending application of Koury et al., Ser. No. 324,265, filed Nov. 18, 1963, entitled "High Pressure Electric Discharge Device" and assigned to the same assignee as the instant application.

If necessary, an additional aperture may be made within one of the end caps to provide for a refractory metal starting probe (not shown) generally formed of tungsten. A lead-in wire is welded to the probe and extends outside of the arc tube to provide for an electrical connection.

It is apparent that modifications and changes may be made within the spirit and scope of the invention, but it is our intention however only to be limited by the scope and spirit of the appended claims.

We claim:

1. An electric discharge device comprising: an envelope formed of a polycrystalline alumina; separate end caps attached to each end of said envelope; said end caps being formed of the same polycrystalline alumina as said envelope; a fill in said envelope including a halogen; a tungsten electrode disposed in each of said end caps and extending within said envelope; a lead-in wire attached to each of said electrodes and being of a metal dissimilar to that of said electrodes; the joints between said tungsten electrodes and said lead-in wires being disposed within said end caps so as to prevent a chemical reaction between the halogen of the fill and said lead-in wires.

2. The device according to claim 1 wherein the joint between said electrode and said lead-in wire is frit sealed in said end cap so as to prevent a chemical reaction between said lead-in wire and the halogen of the fill.

3. An electric discharge device comprising: an envelope formed of a polycrystalline alumina; separate end caps attached to each end of said envelope; said end caps being formed of the same polycrystalline alumina as said envelope; a tungsten electrode disposed in each of said end caps and extending within said envelope; a lead-in wire attached to each of said electrodes and being of a metal dissimilar to that of said electrodes; the joints between said tungsten electrodes and said lead-in wires being disposed at a point distant to the interior of said envelope; and said lead-in wires having a co-efficient of expansion substantially similar to that of the alumina end caps, whereby said lead-in wires will not dissociate themselves from said end caps when an arc is formed within said envelope.

4. The device according to claim 3 wherein said lead-in wires are niobium.

5. An electric discharge device comprising: a generally tubular envelope formed of a polycrystalline alumina; separate end caps attached to each end of said envelope; said end caps being a pair of discs having substantially the same outer diameter as said envelope and being formed of the same polycrystalline alumina as said envelope; a tungsten electrode disposed in an aperture in each of said end caps and extending within said envelope; a lead-in wire attached to each of said electrodes and being of a metal dissimilar to that of said electrodes; and the joints between said tungsten electrodes and said lead-in wires being disposed at a point distant to the interior of said envelope.

References Cited

UNITED STATES PATENTS

| | | | |
|---|---|---|---|
| 2,353,668 | 7/1944 | Hinman | 313—221 X |
| 2,971,110 | 2/1961 | Schmidt | 313—221 |
| 3,132,279 | 5/1964 | Lewin | 313—218 X |
| 3,315,116 | 4/1967 | Beese | 313—217 |

FOREIGN PATENTS

| | | |
|---|---|---|
| 1,351,331 | 12/1963 | France. |
| 431,450 | 2/1935 | Great Britain. |

STANLEY D. SCHLOSSER, *Primary Examiner.*